United States Patent [19]

Tomlinson et al.

[11] Patent Number: 4,631,078

[45] Date of Patent: Dec. 23, 1986

[54] COATING OPTICAL FIBRES

[75] Inventors: Paul G. Tomlinson, Sawbridgeworth; Richard T. Newbould, Harlow, both of United Kingdom

[73] Assignee: STC plc, London, England

[21] Appl. No.: 782,930

[22] Filed: Oct. 2, 1985

[30] Foreign Application Priority Data

Oct. 10, 1984 [GB] United Kingdom ............... 8425610

[51] Int. Cl.[4] .................... C03B 37/027; C03C 25/02
[52] U.S. Cl. ..................................... 65/3.11; 65/3.13; 65/11.1; 65/29; 118/672; 118/680; 427/163
[58] Field of Search ............... 65/3.11, 3.13, 11.1, 65/29; 118/672, 680; 427/10, 163

[56] References Cited

U.S. PATENT DOCUMENTS

| 4,194,462 | 3/1980 | Knowles | 65/11.1 X |
| 4,321,072 | 3/1982 | Dubos et al. | 65/3.11 |
| 4,410,344 | 10/1983 | Iyengar | 65/3.11 |

FOREIGN PATENT DOCUMENTS

| 0029759 | 10/1980 | European Pat. Off. . |
| 1532343 | 5/1977 | United Kingdom . |

Primary Examiner—Robert Lindsay
Attorney, Agent, or Firm—Kerkam, Stowell, Kondracki & Clarke

[57] ABSTRACT

A coating material is applied to drawn lightguide fibre (36') by an applicator (6) which tilts about x and y axes under the control of a concentricity monitor (7) to maintain the coating of the coated fibre (36) concentric about the fibre.

5 Claims, 5 Drawing Figures

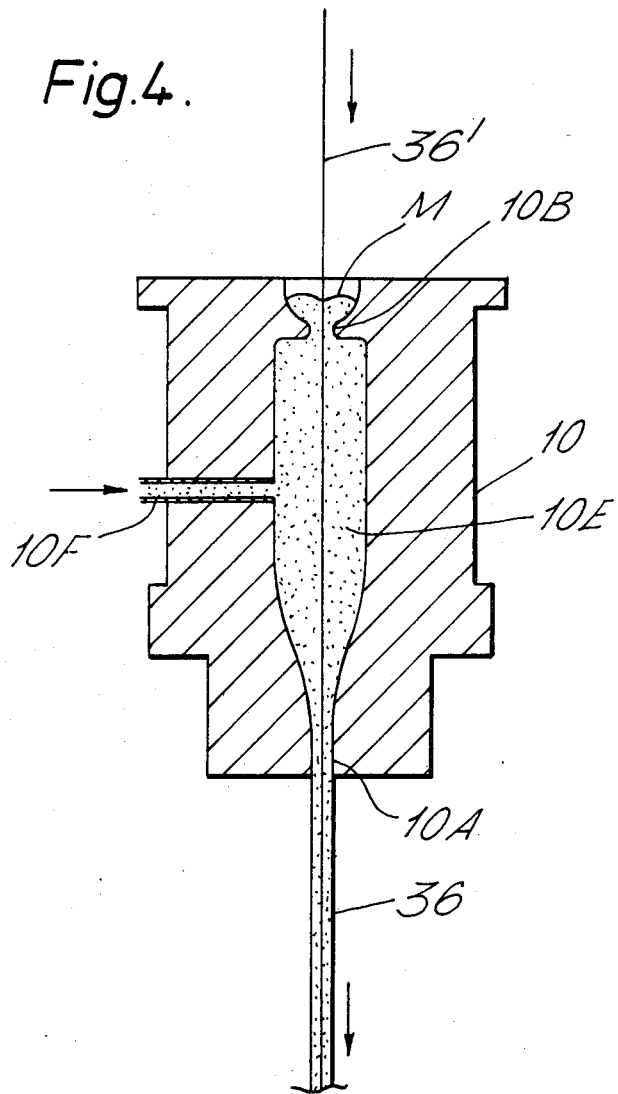

COATING OPTICAL FIBRES

BACKGROUND OF THE INVENTION

This invention relates to the manufacture of optical fibres, particularly to coating a fibre.

An optical fibre for telecommunications comprises a glass fibre drawn from a thicker glass rod (preform) in a high temperature furnace. The diameter of the fibre is measured by a monitor and interfaced with the speed at which the fibre is drawn in order to control the diameter of the fibre. It is also arranged to control movement of the preform chuck to maintain the position of the fibre-line below the furnace.

Bare glass fibre has a strength which is easily degraded by the smallest of surface flaws. At least one durable protective coating is applied as soon as practical to the bare glass fibre to preserve the near flawless surface of a freshly drawn fibre. To give maximum protection any coating must be concentric about the fibre. A non-contacting concentricity monitor is used to monitor, and provide information to adjust the coating concentricity.

PRIOR ART

In existing fibre drawing systems, fibre coatings are applied in a fluid state and under a degree of pressure onto the bare glass fibre as it passes through a coating applicator. Concentricity is adjusted by movement of the coating applicator about a static fibre-line. One method of adjustment is to translate the applicator in the horizontal plane (i.e. the plane perpendicular to the fibre-line). This method is found to be satisfactory when used with applicators with a "self-centering" coating capability, although drawbacks have been encountered. In particular, the response time to adjustments is long and a slight movement of the ideally static fibre-line results. U.S. Pat. 4321072 shows such an arrangement.

SUMMARY OF THE INVENTION

According to the present invention there is provided a method of coating an optical fibre comprising drawing the fibre through a coating applicator having an entrance orifice and an exit orifice substantially concentric about the fibre, monitoring the concentricity of the coating on the fibre, and tilting the applicator about a pivot point at or close to the lower exit orifice to adjust and thereby maintain the desired concentricity of the coating on the fibre. According to another aspect of the present invention there is provided apparatus for coating an optical fibre, comprising a coating applicator having an extrance orifice and an exit orifice through which the fibre passes, means for mounting the applicator so both orifices are substantially concentric about the fibre-line, and means for tilting the applicator about a pivot point at or close to the lower exit orifice in order to adjust and thereby maintain the desired concentricity of the coating on the fibre.

BRIEF DESCRIPTION OF THE DRAWINGS

In order that the invention can be clearly understood, reference will now be made to the accompanying drawings, in which:

FIG. 4 shows in more detail the coating chamber 10 of FIG. 2.

DESCRIPTION OF THE PREFERRED EMBODIMENT

Figure 1:
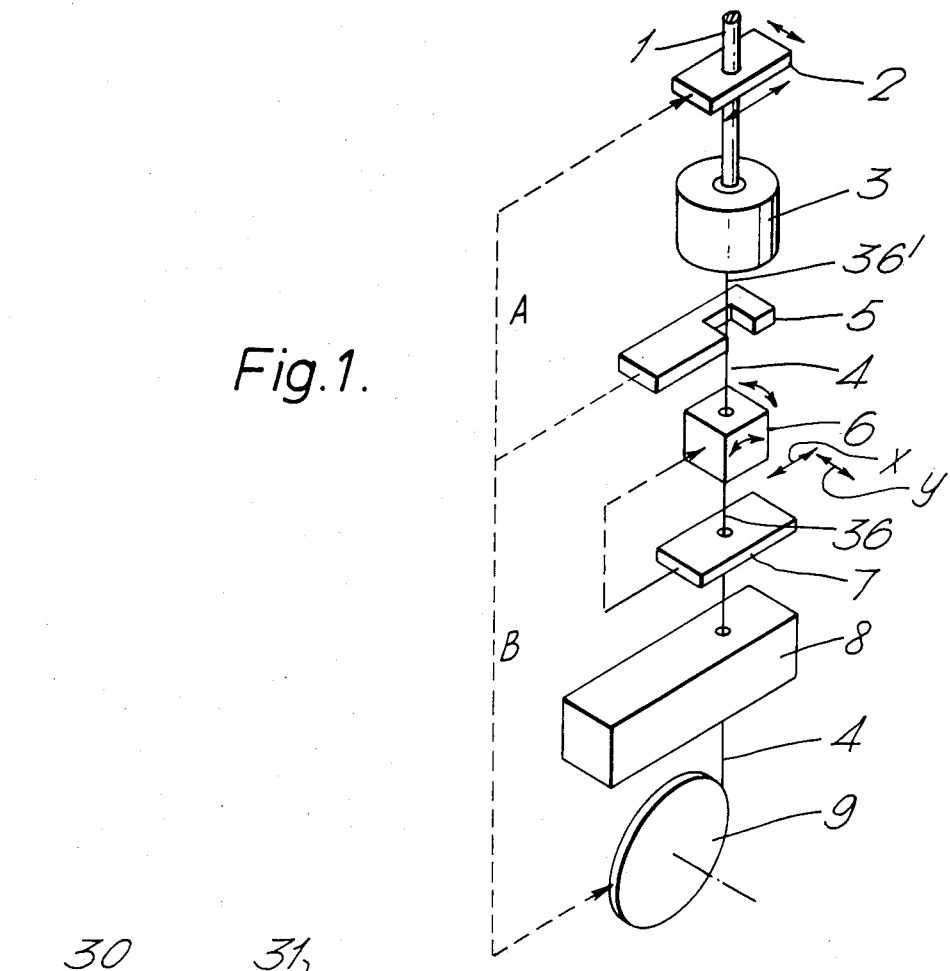
FIG. 1 shows schematically an optical fibre manufacturing equipment according to the embodiment of the invention.

Referring to FIG. 1 a glass preform 1 is held in a preform chuck 2 which is adjustable in a horizontal plane to maintain the position of the fibre line below the furnace 3. The high temperature furnace 3 melts the preform and the glass fibre 4 is drawn by the fibre drawing wheel 9. The diameter of the fibre 4 is monitored by a fibre diameter monitor 5 which is interfaced electronically with the fibre drawing wheel 9 in order to control the fibre diameter. The monitor 5 also controls movement of the preform chuck 2 to maintain the fibre-line position below the furnace. These controls/interfaces are indicated by the broken lines A and B.

The fibre enters a coating applicator 6 which is tiltably mounted to tilt about x and y axes under the control of a coating concentricity monitor 7 to maintain the coating, which may be Nylon 12 or acrylate, concentric with the fibre.

The coating is cured in a curing stage 8.

Concentricity adjustments are effected by guidance from the top orifice which restrains the fibre movement and situates it into the centre of the lower orifice. Response time has been found to be almost instantaneous. The fibre-line remains constant below the applicator during adjustments and so avoids complications connected with subsequent coating stages.

Figure 2A:
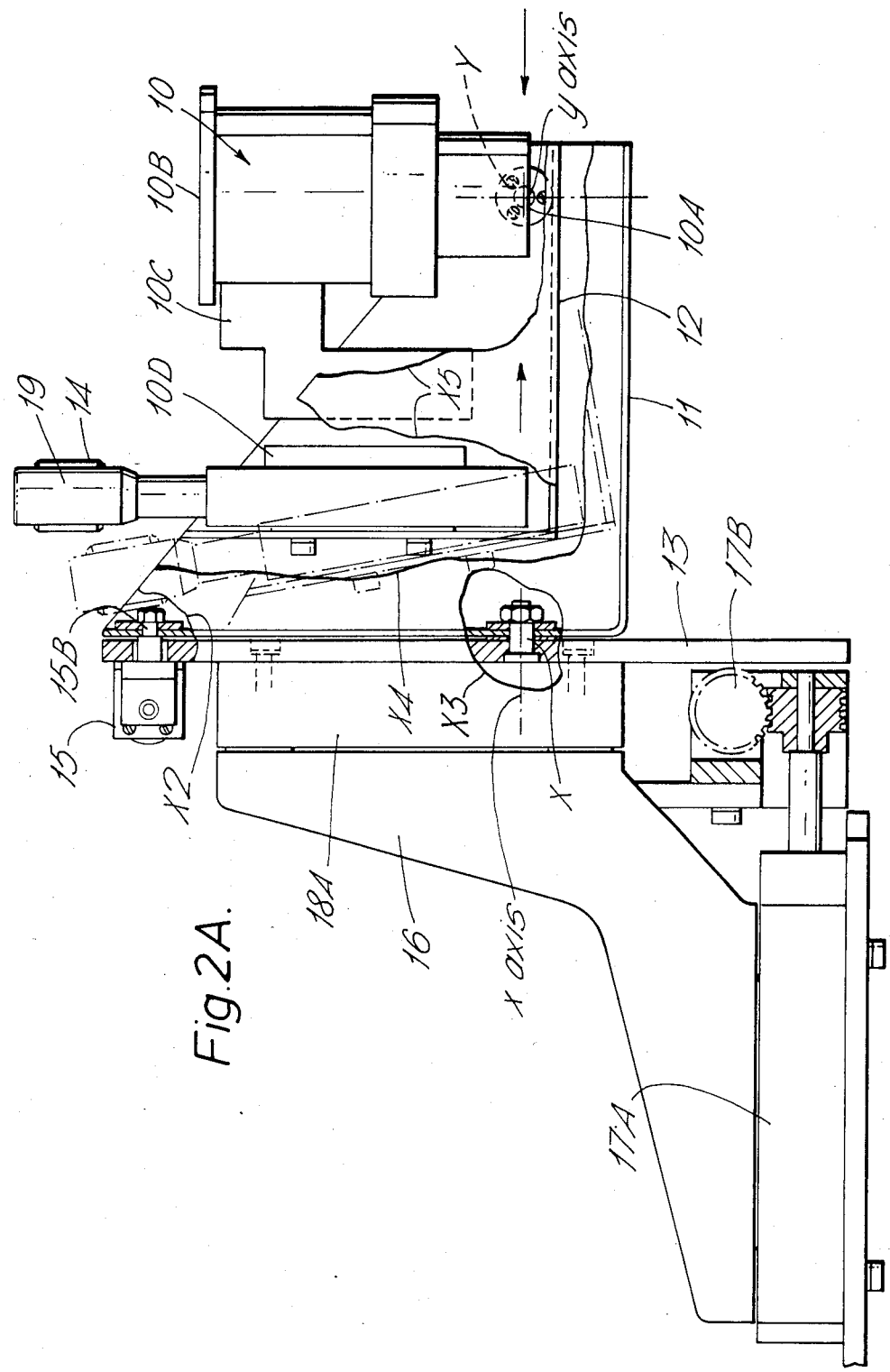
FIG. 2 shows in detail a preferred form of the applicator shown in FIG. 1, FIG. 2A being a side view and FIG. 2B a front view.
Figure 2B:
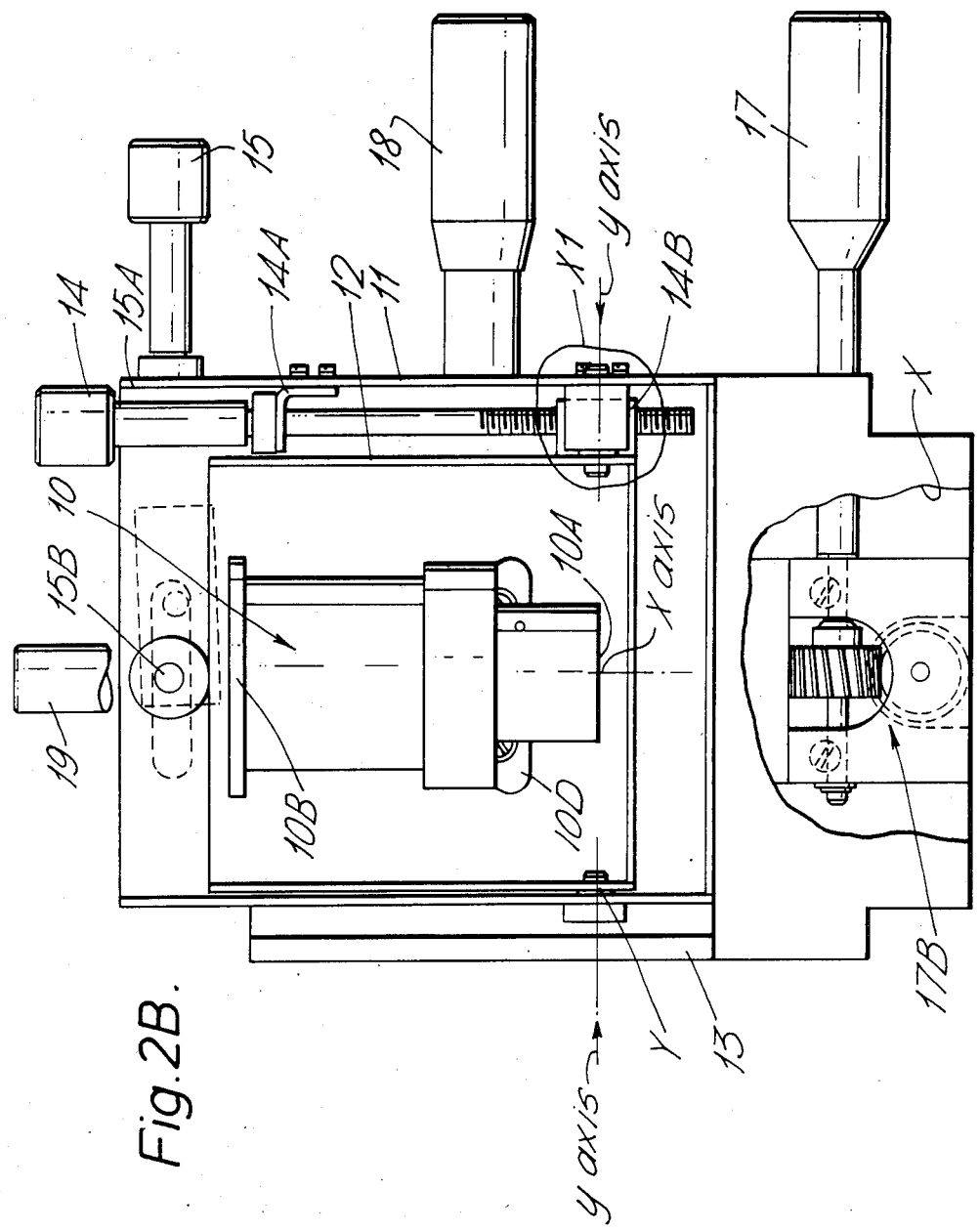

Referring now to FIG. 2 this has various cut-away lines X1 and X6 in FIG. 2B, and X2, X3, X4, X5 in FIG. 2A, for clarity. X4 (FIG. 2A) cuts away most of the near side wall of frame 11 to reveal frame 12 and X5 cuts away the near side wall of frame 12 to reveal chamber 10 and actuator 19. The applicator comprises a chamber 10 mounted on a first frame 12 which is pivotally mounted at Y on a second frame 11 to pivot about the y axis. Thus the chamber 10 and frame 12 pivot together about the y axis with respect to second frame 11. Frame 11 in turn is pivotally mounted at X on a support frame 13 for pivotting the chamber 10 about the x axis. Pivot X is shown within the cut-away line X3 removing parts of the frames 11 and 13 for clarity in FIG. 2A.

An electric actuator 14 is mounted at 14A on the frame 13 and is coupled at 14B to the frame. The coupling 14B is shown within the cut-away line X1 in FIG. 2B which has cut away the second Y pivot for clarity. Actuator 14 is the y-actuator for pivoting the chamber 10 and frame 12 about the y-axis.

A second electric actuator 15 is mounted at 15A (FIG. 2B) on the support frame 13 and coupled at 15B to the second frame 11. This coupling 15B is shown within the cut-away line X2 which has cut away parts of the frame 11 and 13 for clarity in FIG. 2A. Actuator 15 is the x-actuator for pivotting the chamber 10, and frames 11 and 12, about the x-axis with respect to the support frame 13.

The support frame 13 is mounted on a mounting bracket 16 in such a way that it can slide horizontally i.e. parallel to the x and y axis to shift the x-axis laterally and shift the y axes laterally so that the exit orifice 10A of the chamber 10 can be initially aligned with the fibre line as shown in FIG. 1. Linear actuators 17 and 18 are arranged to move the frame 13 to laterally shift the x and y axes, respectively, via slides 17A and 18A respectively. The linkeage mechanism 17B of one of the actuators (17) and which includes 45° DAVAL gears is shown within the cut away line X3 which cuts away part of the support frame 13 for clarity in FIG. 2B. The third linear actuator 19 is also provided to adjust the height of the applicator via a slide 19A mounted on the frame 12. Thus the height of the exit orifice of the chamber 10 can be adjusted so that it is level with the x and y tilt axes.

The chamber 10 is mounted via a mount 10C on a wedge bracket 10D, in turn mounted on slide 19A of actuator 19.

Figure 3:
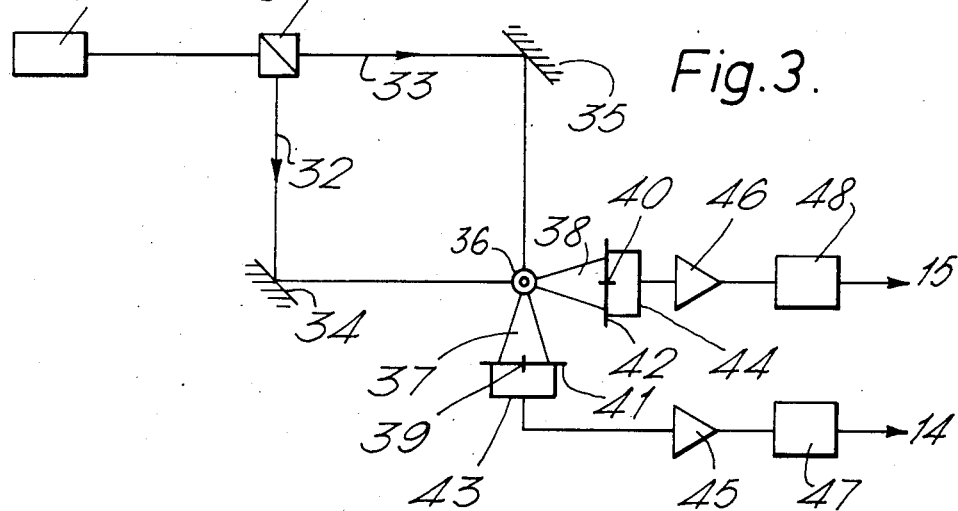
FIG. 3 shows in more detail the concentricity monitor of FIG. 1.

The concentricity monitor shown in FIG. 1 is shown in more detail in FIG. 3. It comprises essentially a light source 30, in this case a He-Ne laser, directed through a 50/50 beam splitter 31 which provides orthogonal beams 32 and 33 which are reflected through 90° by mirrors 34, 35 on to the fibre 36 which has just been coated. The coated fibre 36 produces scatter patterns 37,38 which are symmetrical about central axes 39, 40 and displayed on transluscent screens 41,42.

The two light scatter patterns will be symmetrical in nature when the coating is concentric on the fibre, but become asymmetric for small coating eccentricities.

The patterns are electronically detected by detector 43 and 44 which feed differential amplifiers 45,46, whereby the asymetries are resolved and the necessary drive signals representative of the eccentricities are derived from respective power supplies 47, 48 to drive the motors of actuators 14 and 15 to adjust the tilts to maintain the described concentricity.

The coating chamber 10 can be as described in our co-pending British patent application No. 8403617 (N. Denton - P. Tomlinson 3-1) and this is shown schematically in FIG. 4 as a sectional view. The chamber contains the coating material 10E under pressure from port 10F and this rises to form a meniscus M just above the upper orifice 10B and around the approaching bare fibre 36.

It is found quite unexpectedly that a very good stable and concentric coating can be achieved. Tilting the chamber 10 shifts the fibre 36' at the entrance orifice 10B and centralises it in the exit orifice 10A. This is believed to be the explanation. It is however believed that an open cup applicator i.e. non-pressurised, could with advantage use the tilting arrangement described.

We claim:

1. A method of coating an optical fibre comprising drawing the fibre through a coating applicator having an entrance orifice and an exit orifice substantially concentric about the fibre, monitoring the concentricity of the coating on the fibre, and tilting the applicator about a pivot point at or close to the lower exit orifice to adjust and thereby maintain the desired concentricity of the coating on the fibre.

2. Apparatus for coating an optical fibre, comprising a coating applicator having an extrance orifice and an exit orifice through which the fibre passes, means for mounting the applicator so both orifices are substantially concentric about the fibre-line, and means for tilting the applicator about a pivot point at or close to the lower exit orifice in order to adjust and thereby maintain the desired concentricity of the coating on the fibre.

3. Apparatus as claimed in claim 2, comprising a first frame, a coating chamber mounted on the first frame, a second frame, the first frame being pivotally mounted on the second frame about a first axis, and a mounting frame, the second frame being pivotally mounted on the mounting frame about a second axis perpendicular to the first axis.

4. Apparatus as claimed in claim 3, wherein the mounting frame is mounted for lateral movement so that the first and second axes can each be shifted laterally whereby to set up the applicator with the orifices concentric with the fibre-line.

5. Apparatus as claimed in claim 2 comprising a concentricity monitor in which scatter patterns are produced, means for detecting eccentricities in the patterns and deriving control signals representative thereof to tilt the applicator.

* * * * *